United States Patent
Pope et al.

(10) Patent No.: US 8,403,050 B2
(45) Date of Patent: *Mar. 26, 2013

(54) METHOD FOR TREATING A HYDROCARBON-BEARING FORMATION WITH A FLUID FOLLOWED BY A NONIONIC FLUORINATED POLYMERIC SURFACTANT

(75) Inventors: Gary A. Pope, Austin, TX (US); Jimmie R. Baran, Jr., Prescott, WI (US); Vishal Bang, Houston, TX (US); Mukul M. Sharma, Austin, TX (US)

(73) Assignees: 3M Innovative Properties Company, St. Paul, MN (US); Board of Regents, The University of Texas System, Austin, TX (US)

( * ) Notice: Subject to any disclaimer, the term of this patent is extended or adjusted under 35 U.S.C. 154(b) by 463 days.

This patent is subject to a terminal disclaimer.

(21) Appl. No.: 12/532,650

(22) PCT Filed: Dec. 30, 2007

(86) PCT No.: PCT/US2007/089180
§ 371 (c)(1),
(2), (4) Date: Mar. 1, 2010

(87) PCT Pub. No.: WO2008/118239
PCT Pub. Date: Oct. 2, 2008

(65) Prior Publication Data
US 2010/0276149 A1  Nov. 4, 2010

Related U.S. Application Data

(60) Provisional application No. 60/896,872, filed on Mar. 23, 2007.

(51) Int. Cl.
*E21B 43/16* (2006.01)

(52) U.S. Cl. ............... 166/300; 166/263; 166/305.1

(58) Field of Classification Search ............... 166/263, 166/300, 305.1, 369
See application file for complete search history.

(56) References Cited

U.S. PATENT DOCUMENTS
(Continued)

FOREIGN PATENT DOCUMENTS
| | | |
|---|---|---|
| CA | 2009732 | 8/1990 |
| EP | 1 999 339 | 12/2008 |

(Continued)

OTHER PUBLICATIONS

Supplemental European Search Report for Application No. EP 07 87 0110, dated Jun. 23, 2011.

(Continued)

*Primary Examiner* — Angela M DiTrani
*Assistant Examiner* — Catherine Loikith
(74) *Attorney, Agent, or Firm* — Edwin S. Flores; Chainey P. Singleton; Chalker Flores, LLP

(57) ABSTRACT

The present invention includes a method for treating a hydrocarbon-bearing clastic formation having brine. The method includes contacting the hydrocarbon-bearing clastic formation with a fluid, which at least one of at least partially solubilizes or at least partially displaces the brine in the hydrocarbon-bearing clastic formation, and subsequently contacting the hydrocarbon-bearing clastic formation with a composition. The composition includes a nonionic fluorinated polymeric surfactant and solvent. When the composition is contacting the hydrocarbon-bearing clastic formation, the nonionic fluorinated polymeric surfactant has a cloud point that is above the temperature of the hydrocarbon-bearing clastic formation.

20 Claims, 2 Drawing Sheets

U.S. PATENT DOCUMENTS

| | | | |
|---|---|---|---|
| 2,732,398 A | 1/1956 | Brice et al. | |
| 2,803,615 A | 8/1957 | Ahlbrecht et al. | |
| 3,311,167 A | 3/1967 | O'Brien et al. | |
| 3,394,758 A | 7/1968 | Terry et al. | |
| 3,554,288 A | 1/1971 | Ross | |
| 3,653,442 A | 4/1972 | Ross | |
| 3,787,351 A | 1/1974 | Olson | |
| 3,882,029 A | 5/1975 | Fischer et al. | |
| 3,902,557 A | 9/1975 | Shaughnessy et al. | |
| 4,018,689 A | 4/1977 | Thompson | |
| 4,085,799 A | 4/1978 | Bousaid et al. | |
| 4,200,154 A | 4/1980 | Tate | |
| 4,329,236 A | 5/1982 | Alford et al. | |
| 4,409,110 A | 10/1983 | Borchardt et al. | |
| 4,432,882 A | 2/1984 | Raynolds et al. | |
| 4,440,653 A | 4/1984 | Briscoe et al. | |
| 4,460,791 A | 7/1984 | Cooke | |
| 4,557,837 A | 12/1985 | Clark, III et al. | |
| 4,565,639 A | 1/1986 | Penney et al. | |
| 4,596,662 A | 6/1986 | Walker et al. | |
| 4,609,043 A | 9/1986 | Cullick | |
| 4,609,477 A | 9/1986 | Crema | |
| 4,702,849 A | 10/1987 | Penny | |
| 4,753,740 A | 6/1988 | Marlett et al. | |
| 4,767,545 A | 8/1988 | Karydas et al. | |
| 4,817,715 A | 4/1989 | Peru | |
| 4,823,873 A | 4/1989 | Karydas | |
| 4,921,619 A | 5/1990 | Karydas | |
| 4,923,009 A | 5/1990 | Watkins | |
| 4,975,468 A | 12/1990 | Yiv | |
| 4,993,448 A | 2/1991 | Karydas et al. | |
| 4,997,580 A | 3/1991 | Karydas et al. | |
| 5,042,580 A | 8/1991 | Cullick et al. | |
| 5,092,405 A | 3/1992 | Prukop | |
| 5,129,457 A | 7/1992 | Sydansk | |
| 5,143,958 A | 9/1992 | Lockhart et al. | |
| 5,181,568 A | 1/1993 | Mc Kown et al. | |
| 5,186,257 A | 2/1993 | Stahl et al. | |
| 5,219,476 A | 6/1993 | Lockhart et al. | |
| 5,247,993 A | 9/1993 | Sarem et al. | |
| 5,310,002 A | 5/1994 | Blauch et al. | |
| 5,338,465 A | 8/1994 | Lockhart et al. | |
| 5,358,052 A | 10/1994 | Gidley | |
| 5,415,229 A | 5/1995 | Sydansk | |
| 5,477,924 A | 12/1995 | Pollack | |
| 5,733,526 A | 3/1998 | Trevino et al. | |
| 5,823,262 A | 10/1998 | Dutton | |
| 5,965,659 A | 10/1999 | Kubo et al. | |
| 6,113,919 A | 9/2000 | Reiss et al. | |
| 6,127,430 A | 10/2000 | Baran, Jr. et al. | |
| 6,165,948 A | 12/2000 | Dewenter et al. | |
| 6,206,102 B1 | 3/2001 | Pusch et al. | |
| 6,225,263 B1 | 5/2001 | Collins et al. | |
| 6,274,060 B1 | 8/2001 | Sakashita et al. | |
| 6,443,230 B1 | 9/2002 | Boles et al. | |
| 6,576,597 B2 | 6/2003 | Dobson, Jr. et al. | |
| 6,579,572 B2 | 6/2003 | Espin et al. | |
| 6,660,693 B2 | 12/2003 | Miller et al. | |
| 6,664,354 B2 | 12/2003 | Savu et al. | |
| 6,689,854 B2 | 2/2004 | Fan et al. | |
| 6,729,409 B1 | 5/2004 | Gupta et al. | |
| 6,767,869 B2 | 7/2004 | DiLullo et al. | |
| 6,805,198 B2 | 10/2004 | Huang et al. | |
| 6,852,781 B2 | 2/2005 | Savu et al. | |
| 6,911,417 B2 | 6/2005 | Chan et al. | |
| 6,945,327 B2 | 9/2005 | Ely et al. | |
| 6,972,274 B1 | 12/2005 | Slikta et al. | |
| 7,072,809 B2 | 7/2006 | Egermann et al. | |
| 7,084,094 B2 | 8/2006 | Gunn et al. | |
| 7,132,456 B2 | 11/2006 | Gillig et al. | |
| 7,165,613 B2 | 1/2007 | Chan et al. | |
| 7,199,197 B2 | 4/2007 | Caldwell et al. | |
| 7,256,160 B2 | 8/2007 | Crews | |
| 7,417,099 B2 | 8/2008 | Savu et al. | |
| 7,585,817 B2 | 9/2009 | Pope et al. | |
| 7,727,710 B2 | 6/2010 | Haddad et al. | |
| 7,772,162 B2 | 8/2010 | Pope et al. | |
| 7,855,167 B2 | 12/2010 | Michnick et al. | |
| 8,043,998 B2 * | 10/2011 | Pope et al. | 507/205 |
| 8,138,127 B2 | 3/2012 | Pope et al. | |
| 2001/0016562 A1 | 8/2001 | Muir et al. | |
| 2002/0028750 A1 | 3/2002 | Dobson et al. | |
| 2003/0092581 A1 | 5/2003 | Crews | |
| 2003/0114315 A1 | 6/2003 | Schwartz et al. | |
| 2003/0139549 A1 | 7/2003 | Savu | |
| 2004/0186254 A1 | 9/2004 | Fan et al. | |
| 2006/0264334 A1 | 11/2006 | Gupta et al. | |
| 2007/0015669 A1 | 1/2007 | Zhang | |
| 2007/0029085 A1 * | 2/2007 | Panga et al. | 166/263 |
| 2007/0123430 A1 * | 5/2007 | Pasquier et al. | 507/136 |
| 2007/0225176 A1 * | 9/2007 | Pope et al. | 507/221 |
| 2008/0047706 A1 * | 2/2008 | Pope et al. | 166/252.1 |
| 2008/0051300 A1 * | 2/2008 | Pope et al. | 507/226 |
| 2008/0051551 A1 | 2/2008 | Pope et al. | |
| 2010/0137169 A1 | 6/2010 | Pope et al. | |
| 2010/0152071 A1 | 6/2010 | Pope et al. | |
| 2010/0181068 A1 | 7/2010 | Pope et al. | |
| 2010/0224361 A1 | 9/2010 | Pope et al. | |
| 2010/0270019 A1 * | 10/2010 | Pope et al. | 166/305.1 |
| 2010/0276149 A1 | 11/2010 | Pope et al. | |
| 2010/0307831 A1 * | 12/2010 | Pasquier et al. | 175/65 |
| 2010/0319920 A1 | 12/2010 | Pope et al. | |

FOREIGN PATENT DOCUMENTS

| | | |
|---|---|---|
| EP | 2 054 485 | 5/2009 |
| EP | 2 132 240 A1 | 12/2009 |
| JP | 3-219248 | 9/1991 |
| JP | 7-101803 | 4/1995 |
| JP | 8-193021 | 7/1996 |
| RU | 2066744 | 9/1996 |
| RU | 2164291 | 3/2001 |
| SU | 1508967 A3 | 9/1989 |
| WO | 98/02636 A1 | 1/1998 |
| WO | 03/089540 A1 | 10/2003 |
| WO | 2005/028589 A1 | 3/2005 |
| WO | 2005/035936 A1 | 4/2005 |
| WO | 2005/100007 A1 | 10/2005 |
| WO | 2005/100007 A2 | 10/2005 |
| WO | 2006/028608 A1 | 3/2006 |
| WO | 2007/097975 A2 | 8/2007 |
| WO | 2007/097978 A2 | 8/2007 |
| WO | 2007/126431 A1 | 11/2007 |
| WO | 2007126431 A1 | 11/2007 |
| WO | 2008/024865 A1 | 2/2008 |
| WO | 2008/024868 A1 | 2/2008 |
| WO | 2008024865 A2 | 2/2008 |
| WO | 2008/118239 A1 | 10/2008 |
| WO | 2008/118240 A1 | 10/2008 |
| WO | 2008/118241 A1 | 10/2008 |
| WO | 2008/118242 A1 | 10/2008 |
| WO | 2008/118243 A1 | 10/2008 |
| WO | 2008/118244 A1 | 10/2008 |
| WO | 2008118240 A1 | 10/2008 |
| WO | 2008118242 A2 | 10/2008 |
| WO | 2008118243 A1 | 10/2008 |
| WO | 2008118244 A1 | 10/2008 |
| WO | 2009/085936 A1 | 7/2009 |

OTHER PUBLICATIONS

Extended European Search Report for EP 07 87 0115 dated Aug. 5, 2010.

Supplementary European Search Report for EP 07870113.3 dated Feb. 9, 2010.

Adibhatla, B., et al., "Effect of surfactants on wettability of near-wellbore regions of gas reservoirs," J Petr Sci Engr (2006), 52:227-236.

Al-Anazi et al., "Laboratory Measurements of Condensate Blocking and Treatment for Both Low and High Permeability Rocks", 2002, SPE 77546, Society of Petroleum Engineers Inc., pp. 1-9.

Al-Anazi et al., "A Successful Methanol Treatment in a Gas-Condensate Reservoir: Field Application", Mar. 2003, SPE 80901, Society of Petroleum Engineers Inc., pp. 1-9.

Al-Anazi, "Experimental Measurements of Condensate Blocking and Treatments in Low and High Permeability Cores" (Thesis), Dec. 2003, pp. 1-474.

Ayyalasomayajula et al., "Phase Behavior Modeling of Hydrocarbon-Methanol-Water Mixtures by Peng-Robinson and SAFT Equations of State", Sep. 2002, SPE 77575, Society of Petroleum Engineers Inc., pp. 1-8.
Ayyalasomayajula, "Prediction of Bulk and Interfacial Thermodynamic Properties of Polar Mixtures by Statistical Associating Fluid Theory" (Thesis), May 2003, pp. 1-268.
Bang, "Phase Behavior Study of Hydrocarbon-Water-Alcohol Mixtures" (Thesis) May 2005, pp. 1-138.
Chowdhury, "Reservoir Simulation of Asphaltene Precipitation and of Gas Condensates" (Thesis), Dec. 2003, pp. 1-227.
Chowdhury et al., "A Semi-Analytical Method to Predict Well Deliverability in Gas-Condensate Reservoirs", Sep. 2004, SPE 90320, Society of Petroleum Engineers Inc., pp. 1-13.
Crema et al., "Foaming of Anhydrous Methanol for Well Stimulation", Apr. 1985, SPE 13565, Society of Petroleum Engineers Inc., 4 pages.
Du et al., "Use of Solvents to Improve the Productivity of gas Condensate Wells", Oct. 2000, SPE 62935, Society of Petroleum Engineers Inc., pp. 1-8.
Extended European Search Report for EP 07870112.5, dated Jul. 1, 2011, 8 pages.
Extended European Search Report for EP 07870115, dated Aug. 5, 2010, 8 pages.
Fahes et al., "Wettability Alteration to Intermediate Gas-Wetting in Gas-Condensate Reservoirs at High Temperatures", Oct. 2005, SPE 96184, Society of Petroleum Engineers Inc., pp. 1-14.
Gadde et al., "Modeling Proppant Settling in Water-Fracs", Sep. 2004, SPE 89875, Society of Petroleum Engineers Inc., pp. 1-10.
International Search Report and Written Opinion for PCT/US2007/089181, dated Jun. 11, 2008, 9 pages.
International Search Report and Written Opinion for PCT/US2007/089182, dated Jul. 1, 2008, 1 page.
Kumar, "A Simulation Study of Carbon Sequestration in Deep Saline Aquifers" (Thesis), Aug. 2004, pp. 1-192.
Lee, "Phase Equilibria in Systems Containing Hydrocarbon, Water and Methanol" (Thesis), May 2003, pp. 1-92.
Li, K. et al "Experimental Study of Wettability Alteration to Preferential Gass-Wetting in Porous Media and Its Effects," SPE Reservoir Eval and Eng (2000), 3:139-149.
Mahadevan et al., "Clean-up of Water Blocks in Low Permeability Formations", Oct. 2003, SPE 84216, Society of Petroleum Engineers Inc., pp. 1-8.
Mahadevan et al., "Evaporative Clean-up of Water-Blocks in Gas Wells", Apr. 2005, SPE 94215, Society of Petroleum Engineers Inc., pp. 1-11.
Narayanaswamy et al., "Effect of Heterogeneity on the Non-Darcy Flow Coefficient", Mar. 1998, SPE 39979, Society of Petroleum Engineers Inc., pp. 1-17.
Nasr-El-Din et al., "Surface tension of HCl-based stimulation fluids at high temperatures", Jun. 2004, Journal of Petroleum Science and Engineering, vol. 43(1-2), pp. 57-73.

Ortiz et al., "Low-pH methanol: an alternative for stimulation in water-sensitive, tight, dirty sandstones", 1986, SPE Production Engineering (0885-9221), vol. 1(3). pp. 195-202.
Parekh et al., "Cleanup of Water Blocks in Depleted Low-Permeability Reservoirs", Sep. 2004, SPE 89837, Society of Petroleum Engineers Inc., pp. 1-12.
Pope et al., "Modeling Relative Permeability Effects in Gas-Condensate Reservoirs using a New Trapping Model", Sep. 1998, SPE 49266, Society of Petroleum Engineers Inc., pp. 1-8.
Product Information: 3M™ Novec Fluorosurfactant FC-4430, Oct. 2005, 6 pages.
Product Information: 3M™ Novec Fluorosurfactant FC 4432, Oct. 2005, 6 pages.
Product Information: 3M™ Novec Fluorosurfactant FC 4434, Jan. 2005, 4 pages.
Rai, "Parametric Study of Relative Permeability Effects on Gas-Condensate core Floods and Wells" (Thesis), Dec. 2003, pp. 1-319.
Sharma, "Modeling Gas Condensate Reservoirs and Development of a New Hybrid Well Model" (Thesis), May 2003, pp. 1-231.
Sharma et al., "Slick Water and Hybrid Fracs in the Bossier: Some Lessons Learnt", Sep. 2004, SPE 89876, Society of Petroleum Engineers Inc., pp. 1-12.
Extended European Search Report for EP 07870113.3, dated Feb. 9, 2010, 10 pages.
Extended European Search Report for EP 07870110.9, dated Jul. 1, 2011, 9 pages.
Tang, G-Q., et al., "Relative Permeability Modification in Gas-Liquid Systems Through Wettability Alteration to Intermediate Gas-Wetting," Oct. 2000, SPE 62934, Society of Petroleum Engineers Inc., pp. 1-15.
U.S. Department of Energy, "Comments on the Outlook for Balancing Natural Gas Supply and Demand, EPAct Section 1818: Natural Gas Shortage Report," http://www.fossil.energy.gov/epact/Section_1818/comments.html, accessed Mar. 16, 2008, 26 pages.
Wu et al., "Modeling Non-Equilibrium Mass Transfer Effects for a Gas Condensate Field", Mar. 1998, SPE 39764, Society for Petroleum Engineers Inc., pp. 1-16.
International Search Report and Written Opinion for PCT/US2007/076562, dated Sep. 22, 2008, 8 pages.
Written Opinion for PCT/US2007/089182, dated Jul. 1, 2008, 10 pages.
Written Opinion for PCT/US2007/089180, dated Jun. 11, 2008, 4 pages.
Extended European Search Report for EP 07870111, dated Jun. 30, 2011, 8 pages.
Extended European Search Report for EP 07870114, dated Dec. 13, 2011, 10 pages.
US 6,492,477, 12/2002, Savu et al. (withdrawn)

* cited by examiner

METHOD FOR TREATING A HYDROCARBON-BEARING FORMATION WITH A FLUID FOLLOWED BY A NONIONIC FLUORINATED POLYMERIC SURFACTANT

CROSS REFERENCE TO RELATED APPLICATIONS

This application is a national stage filing under 35 U.S.C. 371 of PCT/US2007/089180, filed Dec. 30, 2007, which claims priority to U.S. Provisional Application No. 60/896,872, filed Mar. 23, 2007, the disclosure of which is incorporated by reference in its entirety herein.

BACKGROUND OF THE INVENTION

It is known in the subterranean well drilling art that in some wells (e.g., some oil and/or gas wells) brine is present in hydrocarbon-bearing geological formations in the vicinity of the wellbore (also known in the art as the "near wellbore region"). The brine may be naturally occurring (e.g., connate water) and/or may be a result of operations conducted on the well.

In the case of some wells (e.g., some gas wells), liquid hydrocarbons (also known in the art as "condensate") can form and accumulate in the near wellbore region. The presence of condensate can cause a large decrease in both the gas and condensate relative permeabilities, and thus the productivity of the well decreases.

The presence of brine and/or gas condensate in a near wellbore region of a hydrocarbon-bearing geological formation can inhibit or stop production of hydrocarbons from the well, and hence is typically undesirable.

Various approaches have been tried for increasing the hydrocarbon production of such wells. One approach, for example, involves a fracturing and propping operation (e.g., prior to, or simultaneously with, a gravel packing operation) to increase the permeability of the hydrocarbon-bearing geological formation adjacent to the wellbore. Chemical treatments (e.g., injection of methanol) have also been used to improve productivity of such oil and/or gas wells. The latter treatments are typically injected into the near wellbore region of a hydrocarbon-bearing geological formation where they interact with the brine and/or condensate to displace and/or dissolve it, thereby facilitating increased hydrocarbon production from the well.

Conventional treatments for increasing the hydrocarbon production from wells having brine and/or condensate in the near wellbore region of a hydrocarbon-bearing geological formation, however, are often relatively short-lived, and require expensive and time-consuming retreatment.

Identifying useful chemical treatments and methods that will be effective for increasing hydrocarbon productivity and be durable remains a problem, especially since well conditions such as temperature, brine content and brine composition may vary between wells and/or may even vary over time within a given well.

SUMMARY OF THE INVENTION

In one aspect, the present invention provides a method of treating a hydrocarbon-bearing clastic formation having brine, the method comprising:
  contacting the hydrocarbon-bearing clastic formation with a fluid, wherein the fluid at least one of at least partially solubilizes or at least partially displaces the brine in the hydrocarbon-bearing clastic formation; and
  subsequently contacting the hydrocarbon-bearing clastic formation with a composition, the composition comprising:
    a nonionic fluorinated polymeric surfactant, comprising:
    at least one divalent unit represented by formula:

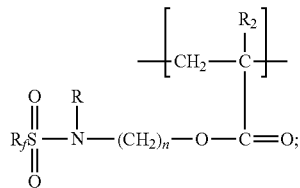

and
    at least one divalent unit represented by formula:

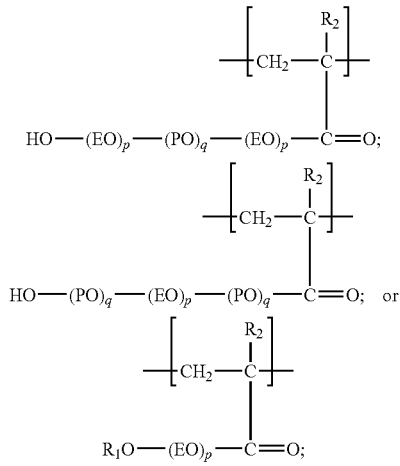

wherein
  $R_f$ represents a perfluoroalkyl group having from 1 to 8 carbon atoms;
  R, $R_1$, and $R_2$ are each independently hydrogen or alkyl of 1 to 4 carbon atoms;
  n is an integer from 2 to 10;
  EO represents —$CH_2CH_2O$—;
  each PO independently represents —$CH(CH_3)CH_2O$— or —$CH_2CH(CH_3)O$—;
  each p is independently an integer of from 1 to about 128; and
  each q is independently an integer of from 0 to about 55; and solvent,
wherein when the composition is contacting the hydrocarbon-bearing clastic formation, the nonionic fluorinated polymeric surfactant has a cloud point that is above the temperature of the hydrocarbon-bearing clastic formation. In some embodiments, the $R_f$ is perfluorobutyl.

In some embodiments, when the composition is contacting the hydrocarbon-bearing clastic formation, the formation is substantially free of precipitated salt. In some embodiments, the fluid is essentially free of surfactant. In some embodiments, the fluid comprises at least one of toluene, diesel, heptane, octane, or condensate. In some embodiments, fluid at least partially solubilizes the brine. In some embodiments, the fluid comprises at least one of a polyol or polyol ether, wherein the polyol and polyol ether independently have from 2 to 25 carbon atoms. In some embodiments, the polyol or polyol ether is at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether. In some embodiments, the fluid further comprises at least one monohydroxy alcohol, ether, or ketone having independently from 1 to 4 carbon atoms.

In some embodiments, the fluid comprises at least one of water, methanol, ethanol, or isopropanol. In some embodiments, the fluid comprises at least one of nitrogen, carbon dioxide, or methane. In some embodiments, the composition comprises at least 50 weight percent (in some embodiments, at least 60, 70, 80 and 90 weight percent) solvent, based on the total weight of the composition. In some embodiments, the composition further comprises water.

In some embodiments, the solvent comprises at least one of a polyol or polyol ether, wherein the polyol and polyol ether independently have from 2 to 25 carbon atoms; and wherein the solvent comprises at least one of monohydroxy alcohol, ether, or ketone independently having from 1 to 4 carbon atoms. In some embodiments, the polyol or polyol ether is at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether. In some embodiments, the solvent comprises at least one monohydroxy alcohol independently having from 1 to 4 carbon atoms.

In some embodiments, the nonionic fluorinated polymeric surfactant has a number average molecular weight in the range of from 1,000 to 30,000, 40,000, 50,000, 60,000, 75,000, 100,000 or more grams/mole. In some embodiments, the hydrocarbon-bearing clastic formation is downhole. In some embodiments, the hydrocarbon-bearing clastic formation has at least one first gas permeability prior to contacting the formation with the fluid and contacting the formation with the composition and at least one second gas permeability after contacting the formation with the fluid and contacting the formation with the composition, and wherein the second gas permeability is at least 5 percent (in some embodiments, at least 10, 15, 20, 30, 40, 50, 60, 70, 80, 90, 100, 110, 120, 130, 140, or even at least 150 percent or more) higher than the first gas permeability. In some embodiments, the relative permeability is relative gas permeability.

In some embodiments, the method may also include allowing condensate to flow into the hydrocarbon-bearing clastic formation after contacting the formation with the fluid and prior to contacting the formation with the composition.

In some embodiments, the formation has condensate, and wherein the fluid at least one of at least partially solubilizes or at least partially displaces the condensate. In some embodiments, the hydrocarbon-bearing clastic formation is penetrated by a well bore, and wherein the method further comprises obtaining hydrocarbons from the well bore after contacting the hydrocarbon-bearing clastic formation with the composition. In some embodiments, the hydrocarbon-bearing clastic formation has at least one fracture. In some embodiments, the fracture has a plurality of proppants therein.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figures 1, 2:
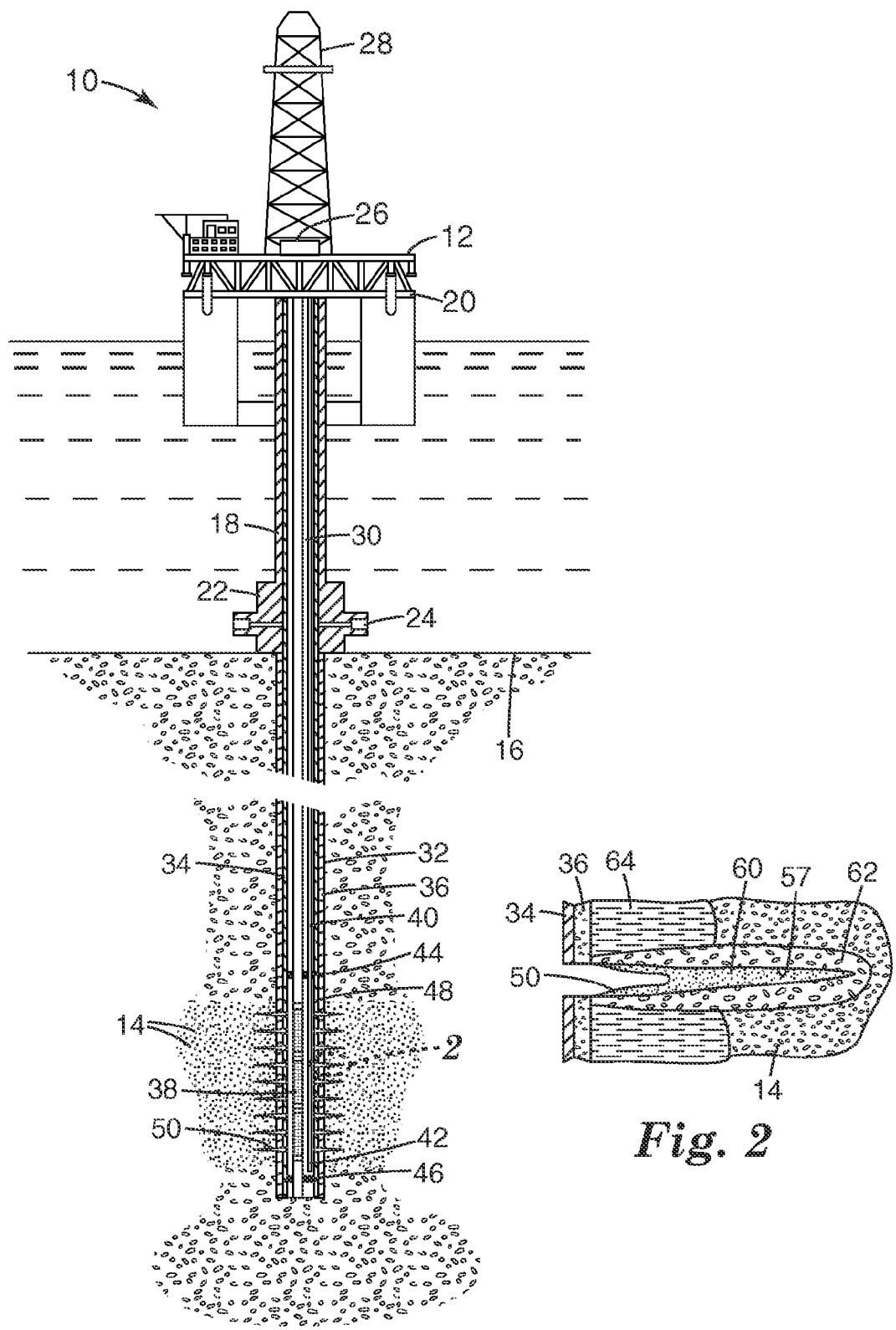
FIG. 1 is a schematic illustration of an exemplary embodiment of an offshore oil and gas platform operating an apparatus for treating a near wellbore region according to the present invention.
FIG. 2 is an expanded view of FIG. 1 that shows the near wellbore region in greater detail for those embodiments related to a fractured formation.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "brine" refers to water having at least one dissolved electrolyte salt therein (e.g., having any nonzero concentration, and which may be, in some embodiments, less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "downhole conditions" refers to the temperature, pressure, humidity, and other conditions that are commonly found in subterranean formations.

The term "homogeneous" means macroscopically uniform throughout and not prone to spontaneous macroscopic phase separation.

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

The term "hydrolyzable silane group" refers to a group having at least one Si—O—Z moiety that undergoes hydrolysis with water at a pH between about 2 and about 12, wherein Z is H or substituted or unsubstituted alkyl or aryl.

The term "nonionic" refers to being free of ionic groups (e.g., salts) or groups (e.g., —$CO_2H$, —$SO_3H$, —$OSO_3H$, —$P(=O)(OH)_2$) that are readily substantially ionized in water.

The term "normal boiling point" refers to the boiling point at a pressure of one atmosphere (100 kPa).

The term "polymer" refers to a molecule of molecular weight of at least 1000 grams/mole, the structure of which includes the multiple repetition of units derived, actually or conceptually, from molecules of low relative molecular mass.

The term "polymeric" refers to including a polymer.

The term "solvent" refers to a homogenous liquid material (inclusive of any water with which it may be combined) that is capable of at least partially dissolving the nonionic fluorinated polymeric surfactant(s) with which it is combined at 25° C.

The term "water-miscible" means soluble in water in all proportions.

The term "productivity" as applied to a well refers to the capacity of a well to produce hydrocarbons; that is, the ratio of the hydrocarbon flow rate to the pressure drop, where the pressure drop is the difference between the average reservoir pressure and the flowing bottom hole well pressure (i.e., flow per unit of driving force).

As used herein, the term "substantially free of precipitated salt" refers to the amount of salts found in water under downhole conditions that precipitates. In one example, substantially free of precipitated salt is an amount of salt that is the less than 5% higher than the solubility product at a given temperature and pressure. In another example, a formation becomes substantially free of precipitated salt when the amount of salt in the formation has been reduced, dissolved or displaced such that the salts do not interfere with the interaction (e.g., adsorption) of the nonionic fluorinated polymeric surfactant with the formation.

The term "cloud point" of a surfactant refers to the temperature at which a nonionic surfactant becomes non-homogeneous in water. This temperature can depend on many variables (e.g., surfactant concentration, solvent concentration, solvent composition, water concentration, electrolyte composition and concentration, oil phase concentration and composition, and the presence of other surfactants).

As used herein, the term "essentially free of surfactant" refers to fluid that may have a surfactant in an amount insufficient for the fluid to have a cloud point, e.g., when it is below its critical micelle concentration. A fluid that is essentially free of surfactant may be a fluid that has a surfactant but in an amount insufficient to alter the wettability of, e.g., a hydrocarbon-bearing clastic formation under downhole conditions. A fluid that is essentially free of surfactant includes those that have a weight percent of surfactant as low as 0 weight percent.

Methods according to the present invention are useful for treating hydrocarbon-bearing clastic formations having brine. The brine may be connate or non-connate water, mobile (e.g., crossflow) or immobile (e.g., residual) water, naturally occurring water or water resulting from operations on the formation (e.g., water from aqueous drilling fluids or aqueous fracturing fluids). In some embodiments, the brine is connate water. Typically, methods according to the present invention are useful when the brine present in the hydrocarbon-bearing clastic formation has a high level of salinity and/or when a high level of water saturation is present in the formation.

In some embodiments, the hydrocarbon-bearing clastic formation comprises at least one of a dry gas reservoir, a wet gas reservoir, a retrograde condensate gas reservoir, a tight gas reservoir, a coal-bed gas reservoir or a storage reservoir.

Fluids (including liquids and gases) useful in practicing the present invention at least one of at least partially solubilizes or at least partially displaces the brine in the hydrocarbon-bearing clastic formation. In some embodiments, the fluid at least partially displaces the brine in the hydrocarbon-bearing clastic formation. In some embodiments, the fluid at least partially solubilizes brine in the hydrocarbon-bearing clastic formation. Examples of useful fluids include polar and/or water-miscible solvents such as monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, or dipropylene glycol) and triols (e.g., glycerol, trimethylolpropane); ethers (e.g., diethyl ether, methyl t-butyl ether, tetrahydrofuran, p-dioxane); polyol ethers such as glycol ethers (e.g., ethylene glycol monobutyl ether, diethylene glycol monomethyl ether, dipropylene glycol monomethyl ether, propylene glycol monomethyl ether, or those glycol ethers available under the trade designation "DOWANOL" from Dow Chemical Co., Midland, Mich.); and ketones (e.g., acetone or 2-butanone). Useful fluids also include liquid or gaseous hydrocarbons (e.g., toluene, diesel, heptane, octane, condensate, methane, and isoparaffinic solvents obtained from Total Fina, Paris, France, under trade designation "ISANE" and from Exxon Mobil Chemicals, Houston, Tex., under the trade designation "ISOPAR") and other gases (e.g., nitrogen and carbon dioxide).

Compositions useful in practicing the present invention comprise a nonionic fluorinated polymeric surfactant and solvent.

Useful nonionic fluorinated polymeric surfactants comprise:

at least one divalent unit represented by formula:

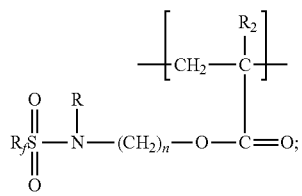

and
at least one divalent unit represented by formula:

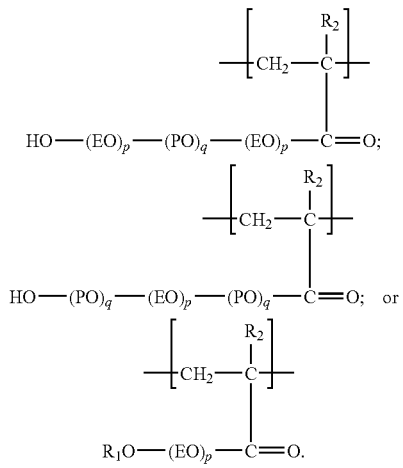

$R_f$ represents a perfluoroalkyl group having from 1 to 8 carbon atoms. Exemplary groups $R_f$ include perfluoromethyl, perfluoroethyl, perfluoropropyl, perfluorobutyl (e.g., perfluoro-n-butyl or perfluoro-sec-butyl), perfluoropentyl, perfluorohexyl, perfluoroheptyl, and perfluorooctyl.

R, $R_1$, and $R_2$ are each independently hydrogen or alkyl of 1 to 4 carbon atoms (e.g., methyl, ethyl, n-propyl, isopropyl, butyl, isobutyl, or t-butyl).

n is an integer from 2 to 10.

EO represents —$CH_2CH_2O$—.

Each PO independently represents —$CH(CH_3)CH_2O$— or —$CH_2CH(CH_3)O$—.

Each p is independently an integer of from 1 to about 128.

Each q is independently an integer of from 0 to about 55. In some embodiments, q may be in a range of from 1 to 55 and the ratio p/q has a value of from at least 0.5, 0.75, 1 or 1.5 to 2.5, 2.7, 3, 4, 5, or more.

The nonionic fluorinated polymeric surfactants described hereinabove are typically preparable by copolymerization of:
at least one compound represented by formula

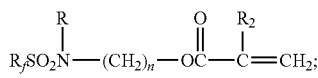

and
at least one compound represented by formula:

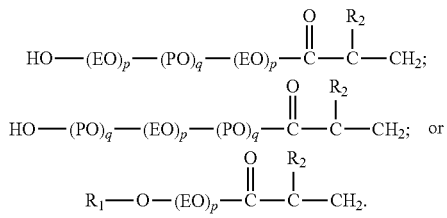

The nonionic fluorinated polymeric surfactants described above can be prepared, for example, by techniques known in the art (e.g., by free radical initiated copolymerization of a nonafluorobutanesulfonamido group-containing acrylate with a poly(alkyleneoxy) acrylate (e.g., monoacrylate or diacrylate) or mixtures thereof). Adjusting the concentration and activity of the initiator, the concentration of monomers, the temperature, and the chain-transfer agents can control the molecular weight of the polyacrylate copolymer. The description of the preparation of such polyacrylates is described, for example, in U.S. Pat. No. 3,787,351 (Olson), the disclosure of which is incorporated herein by reference. Preparation of nonafluorobutanesulfonamido acrylate monomers are described, for example, in U.S. Pat. No. 2,803,615 (Ahlbrecht et al.), the disclosure of which is incorporated herein by reference. Examples of fluoroaliphatic polymeric esters and their preparation are described, for example, in U.S. Pat. No. 6,664,354 (Savu et al.), the disclosure of which is incorporated herein by reference. Methods described above for making nonafluorobutylsulfonamido group-containing structures can be used to make heptafluoropropylsulfonamido groups by starting with heptafluoropropylsulfonyl fluoride, which can be made, for example, by the methods described in Examples 2 and 3 of U.S. Pat. No. 2,732,398 (Brice et al.), the disclosure of which is incorporated herein by reference.

Useful nonionic fluorinated polymeric surfactants typically have a number average molecular weight in the range of from 1,000 to 10,000 grams/mole, 20,000 grams/mole, 30,000 grams/mole, 40,000 grams/mole, 50,000 grams/mole or even 100,000 grams/mole although higher and lower molecular weights may also be useful. It is also within the scope of the present invention to use mixtures of nonionic fluorinated polymeric surfactants.

In some embodiments, the nonionic fluorinated polymeric surfactant is free of hydrolyzable silane groups. This may be advantageous, for example, by prolonging the storage-life of the composition.

Examples of useful solvents include organic solvents, water, and combinations thereof. Examples of organic solvents include polar and/or water-miscible solvents such as monohydroxy alcohols independently having from 1 to 4 or more carbon atoms (e.g., methanol, ethanol, isopropanol, propanol, and butanol); polyols such as, for example, glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, or dipropylene glycol) and triols (e.g., glycerol, trimethylolpropane); ethers (e.g., diethyl ether, methyl t-butyl ether, tetrahydrofuran, p-dioxane; polyol ethers (e.g., glycol ethers (e.g., ethylene glycol monobutyl ether, diethylene glycol monomethyl ether, dipropylene glycol monomethyl ether, propylene glycol monomethyl ether, or those glycol ethers available under the trade designation "DOWANOL" from Dow Chemical Co., Midland, Mich.); ketones (e.g., acetone or 2-butanone), easily gasified fluids (e.g., ammonia, low molecular weight hydrocarbons or substituted hydrocarbons, condensate, and supercritical or liquid carbon dioxide), and mixtures thereof.

In some embodiments, the solvent comprises at least one of a polyol or polyol ether and at least one monohydroxy alcohol, ether, or ketone independently having from 1 to 4 carbon atoms. In these embodiments, in the event that a component of the solvent is a member of two functional classes, it may be used as either class but not both. For example, ethylene glycol methyl ether may be a polyol ether or a monohydroxy alcohol, but not as both simultaneously.

In some embodiments, component(s) of the solvent and/or the fluid may have a normal boiling point of less than 650° F. (343° C.) (in some embodiments, less than 450° F. (232° C.)); for example, to facilitate removal of the solvent and/or fluid from a well after treatment.

In some embodiments, the solvent and/or the fluid comprises a polyol that has independently from 2 to 25 (in some embodiments 2 to 20, 2 to 10, 2 to 8, or even 2 to 6) carbon atoms. In some embodiments, the solvent and/or the fluid comprises a polyol ether that independently has from 3 to 25 (in some embodiments 3 to 20, 3 to 10, 3 to 8, or even 5 to 8) carbon atoms.

Although not wanting to be bound by theory, it is believed that more desirable formation treatment results are obtained when the composition used in a particular hydrocarbon-bearing formation is homogenous at the conditions (e.g., temperature(s) and brine composition) encountered in the formation. Accordingly, the fluid amount and type can selected so that it at least one of solubilizes or displaces a sufficient amount of brine in the formation such that when the composition is added to the formation, the nonionic fluorinated polymeric surfactant has a cloud point that is above at least one temperature found in the formation. In some embodiments, the fluid amount and type can be selected so that it at least one of solubilizes or displaces a sufficient amount of brine in the formation such that when the composition is contacting the formation, the formation is substantially free of precipitated salt.

The effectiveness of compositions described herein for improving the productivity of a particular formation (optionally having condensate therein) can typically be determined by the ability of the composition to dissolve the quantity of brine that remains (and optionally condensate) in the formation after contacting the formation with the fluid. Hence, at a given temperature greater amounts of compositions having lower brine (and/or condensate) solubility (i.e., compositions that can dissolve a relatively lower amount of brine or condensate) will typically be needed than in the case of compositions having higher brine (and/or condensate) solubility and containing the same surfactant at the same concentration.

One convenient method of evaluating whether a composition will be homogeneous under the conditions found in the hydrocarbon-bearing clastic formation involves combining (e.g., in a container) a model brine with a nonionic fluorinated polymeric surfactant-solvent composition at a given temperature, and then mixing the model brine with the composition. The mixture can be evaluated over time (e.g., 5 minutes, 1 hour, 12 hours, 24 hours or longer) to see if it phase separates or becomes cloudy. By adjusting the relative amounts of brine and the composition, it is possible to determine the maximum brine uptake capacity (above which phase separation occurs) of the composition at a given temperature. Varying the temperature at which the above procedure is carried out typically results in a more complete understanding of the suitability of compositions for treating a given well.

Typically, compositions useful in practicing the present invention include from at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or percent by weight of the nonionic fluorinated polymeric surfactant, based on the total weight of the composition. For example, the amount of the nonionic fluorinated polymeric surfactant in the compositions may be in a range of from 0.01 to 10; 0.1 to 10, 0.1 to 5, 1 to 10, or even in a range from 1 to 5 percent by weight of the nonionic fluorinated polymeric surfactant, based on the total weight of the composition. Lower and higher amounts of the nonionic fluorinated polymeric surfactant in the compositions may also be used, and may be desirable for some applications.

The amount of solvent in the composition typically varies inversely with the amount of components in compositions useful in practicing the present invention. For example, based on the total weight of the composition the solvent may be present in the composition in an amount of from at least 10, 20, 30, 40, or 50 percent by weight or more up to 60, 70, 80, 90, 95, 98, or even 99 percent by weight, or more.

In some embodiments, compositions useful in practicing the present invention may further include water (e.g., in the solvent). In some embodiments, compositions according to the present invention are essentially free of water (i.e., contains less than 0.1 percent by weight of water based on the total weight of the composition).

The ingredients for compositions described herein including nonionic fluorinated polymeric surfactant and solvent can be combined using techniques known in the art for combining these types of materials, including using conventional magnetic stir bars or mechanical mixer (e.g., in-line static mixer and recirculating pump).

Generally, the amount of the nonionic fluorinated polymeric surfactant and solvent (and type of solvent) is dependent on the particular application since conditions typically vary between hydrocarbon-bearing formations, for example, at different depths in the formation, and even over time in a given formation. Advantageously, methods according to the present invention can be customized for individual formations and conditions.

Methods according to the present invention may be useful, for example, for recovering hydrocarbons (e.g., at least one of methane, ethane, propane, butane, hexane, heptane, or octane) from hydrocarbon-bearing subterranean clastic formations (in some embodiments, predominantly sandstone). In some embodiments, the hydrocarbon-bearing formation comprises at least one of shale, conglomerate, diatomite, sand or sandstone.

Referring to FIG. 1, an exemplary offshore oil and gas platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

Also shown in FIG. 2, a treatment zone is depicted next to casing 34, cement 36 within perforation 50. In the expanded view, fracture 57 is shown in which proppant 60 has been added. Fracture 57 is shown in relation to "crushed zone" 62 and regions surrounding wellbore 32 region showing virgin hydrocarbon-bearing formation 14. Damaged zone 64 has a lower permeability and is shown between virgin hydrocarbon formation 14 and casing 34.

While the drawing depicts an offshore operation, the skilled artisan will recognize that the compositions and methods for treating a production zone of a wellbore may also be suitable for use in onshore operations. Also, while the drawing depicts a vertical well, the skilled artisan will also recognize that methods of the present invention may also be useful, for example, for use in deviated wells, inclined wells or horizontal wells.

Figure 3:
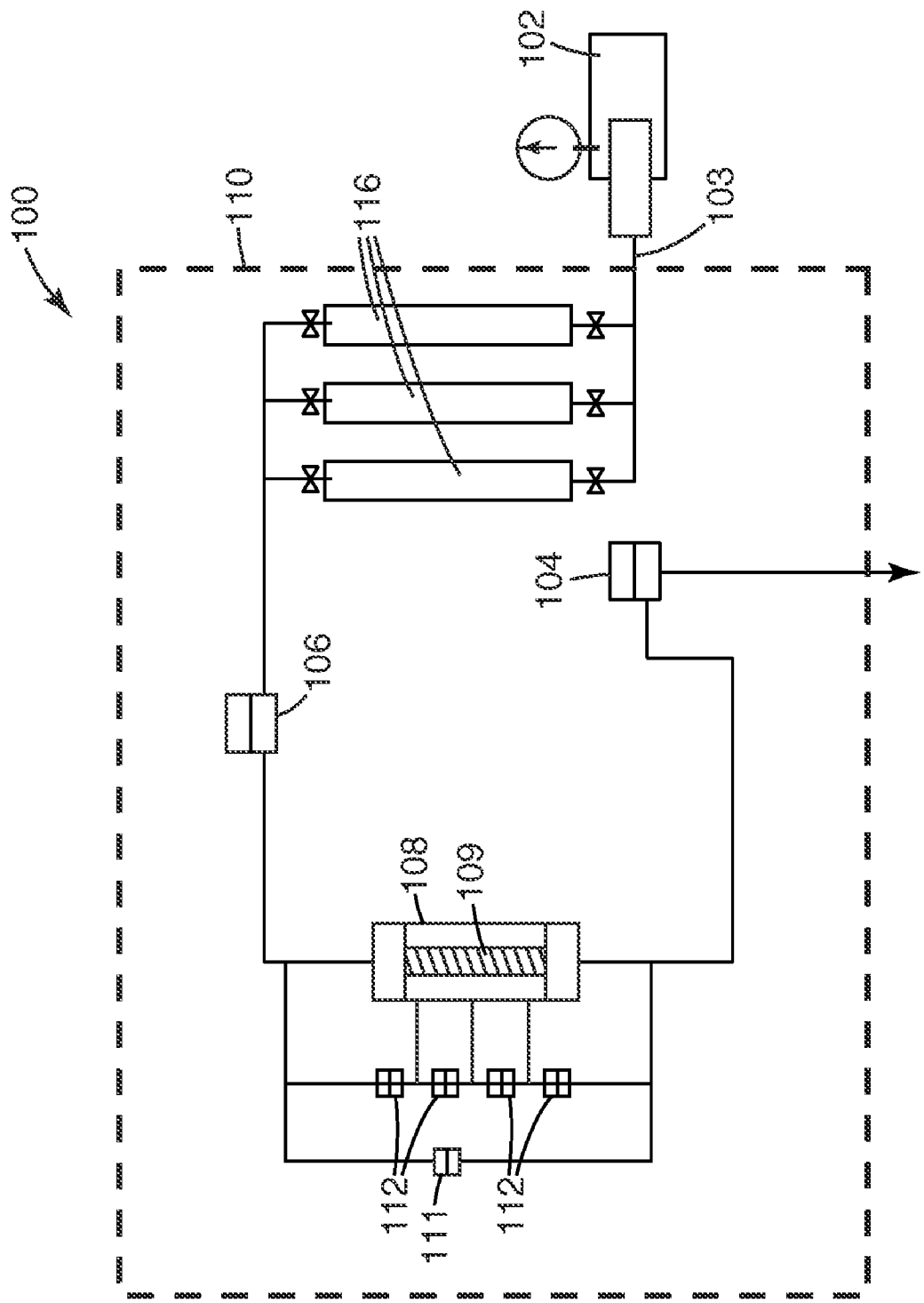
FIG. 3 is a schematic illustration of the core flood set-up to testing cores samples and other materials using the compositions and methods of the present invention.

A schematic diagram of core flood apparatus 100 used to determine relative permeability of the substrate sample is shown in FIG. 3. Core flood apparatus 100 included positive displacement pumps (Model No. 1458; obtained from General Electric Sensing, Billerica, Mass.) 102 to inject fluid 103 at constant rate in to fluid accumulators 116. Multiple pressure ports 112 on core holder 108 were used to measure pressure drop across four sections (2 inches (5.1 cm) in length each) of core 109. Pressure port 111 was used to measure the pressure drop across the whole core. Two back-pressure regulators (Model No. BPR-50; obtained from Temco, Tulsa, Okla.) 104, 106 were used to control the flowing pressure downstream and upstream, respectively, of core 109. The flow of fluid was through a vertical core to avoid gravity segregation of the gas. High-pressure core holder (Hassler-type Model UTPT-1x8-3K-13 obtained from Phoenix, Houston, Tex.) 108, back-pressure regulators 106, fluid accumulators 116, and tubing were placed inside pressure-temperature-controlled oven (Model DC 1406F; maximum temperature rating of 650° F. (343° C.) obtained from SPX Corporation, Williamsport, Pa.) at the temperatures tested.

Typically, it is believed to be desirable to allow for a shut-in time after fractures in the hydrocarbon-bearing formations are contacted with the compositions described herein. Exemplary set in times include a few hours (e.g., 1 to 12 hours), about 24 hours, or even a few (e.g., 2 to 10) days.

The skilled artisan, after reviewing the instant disclosure, will recognize that various factors may be taken into account in practice of the present invention including, for example, the ionic strength of the composition, pH (e.g., a range from a pH of about 4 to about 10), and the radial stress at the wellbore (e.g., about 1 bar (100 kPa) to about 1000 bars (100 MPa)).

Typically, after treatment according to the present invention hydrocarbons are then obtained from the wellbore at an increased rate, as compared the rate prior to treatment. In some embodiments, wherein the formation has at least one fracture, the formation has at least one first conductivity prior to contacting the formation with the composition and at least one conductivity after contacting the formation with the composition, and wherein the second conductivity is at least 5 (in some embodiments, at least 10, 20, 30, 40, 50, 60, 70, 80, 90, 100, 110, 120, 130, 140, or even at least 150 or more) percent higher than the first conductivity.

In some embodiments, the hydrocarbon-bearing clastic formation has at least one fracture. In some of these embodiments, the fracture has a plurality of proppants therein. Fracture proppant materials are typically introduced into the formation as part of a hydraulic fracture treatment. Exemplary proppants known in the art include those made of sand (e.g., Ottawa, Brady or Colorado Sands, often referred to as white and brown sands having various ratios), resin-coated sand, sintered bauxite, ceramics (i.e., glass, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company. In some embodiments, the proppants form packs within a formation and/or wellbore. Proppants may be selected to be chemically compatible with the fluids and compositions described herein. Particulate solids may be introduced into the formation, for example, as part of a hydraulic fracture treatment, sand control particulate introducible into the wellbore/formation as part of any sand control treatment such as a gravel pack or frac pack.

Methods according to the present invention may be practiced, for example, in a laboratory environment (e.g., on a core sample (i.e., a portion) of a hydrocarbon-bearing formation) or in the field (e.g., on a subterranean hydrocarbon-bearing formation situated downhole in a well). Typically, methods according to the present invention are applicable to downhole conditions having a pressure in a range of from about 1 bar (100 kPa) to about 1000 bars (100 MPa) and a temperature in a range from about 100° F. (37.8° C.) to 400° F. (204° C.), although they may also be used to treat hydrocarbon-bearing formations under other conditions.

In addition to brine and optionally condensate, other materials (e.g., asphaltene or water) may be present in the hydrocarbon-bearing formation. Methods according to the present invention may also be used in those cases.

Various methods (e.g., pumping under pressure) known to those skilled in the oil and gas art can be used in accordance with the present invention to contact formations in hydrocarbon-bearing subterranean formations with fluids and compositions comprising solvent and nonionic fluorinated polymeric surfactant. Coil tubing, for example, may be used to deliver the fluid and composition to a particular zone in a formation. In some embodiments, in practicing the present invention it may be desirable to isolate a particular zone in the formation (e.g., with conventional packers) to be contacted with the fluid and the composition.

Advantages and embodiments of this invention are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight.

EXAMPLE 1

A nonionic fluorinated polymeric surfactant ("Nonionic Fluorinated Polymeric Surfactant A") was prepared essentially as in Example 4 of U.S. Pat. No. 6,664,354 (Savu), except using 15.6 grams (g) of 50/50 mineral spirits/organic peroxide initiator (tent-butyl peroxy-2-ethylhexanoate obtained from Akzo Nobel, Arnhem, The Netherlands under the trade designation "TRIGONOX-21-050") in place of 2,2'-azobisisobutyronitrile, and with 9.9 g of 1-methyl-2-pyrrolidinone added to the charges.

A core with the dimensions specified below was cut from a source rock block. The core was dried in an oven at 100° C. for 24 hours and then was weighed. The core was then wrapped with polytetrafluoroethylene (PTFE), aluminum foil and shrink wrapped with heat shrink tubing (obtained under the trade designation "TEFLON HEAT SHRINK TUBING" from Zeus, Inc., Orangeburg, S.C.). The wrapped core was placed into a core holder inside the oven at the experimental temperature.

A preflush was conducted using a fluid pre-flush before treating a gas condensate sandstone formation that has high salinity brine and/or high water saturation. The example was performed using a Berea sandstone core at a temperature of 322° F. (161° C.).

The initial gas permeability was measured using nitrogen at 75° F. (23.9° C.). The initial brine saturation of 30% was established by injecting a measured volume of brine into the vacuumed core. The salinity of brine used was 180,600 ppm. NaCl. The gas relative permeability at initial water saturation was measured using nitrogen at 75° F. (23.9° C.). Table 1 (below) summarizes the properties of the core and the procedure conditions.

TABLE 1

| Core | Berea Sandstone |
| --- | --- |
| Length, inches (cm) | 5.87 (14.91) |
| Diameter, inches (cm) | 1 (2.54) |
| Porosity, % | 20 |
| Pore volume, cc | 15.38 |
| Swi, % | 30 |
| Temperature, ° F. (° C.) | 322 (161) |
| k, md | 311 |

A synthetic hydrocarbon mixture was prepared that exhibits retrograde gas condensate behavior. Table 2 (below) gives the composition of the synthetic gas mixture. A two-phase flood with the fluid mixture was done using the dynamic flashing method, which is also known as the pseudo-steady state method, by flashing the fluid through the upstream back-pressure regular set above the dew point pressure at 5500 psig (37.91 MPa) to the core pressure set below the dew point pressure by the downstream back-pressure regulator. This experiment was done at a core pressure of 2600 psig (17.92 MPa). Table 3 summarizes the results for the pre-treatment two-phase flow.

TABLE 2

| Component | Mole % |
|---|---|
| Methane | 70 |
| n-Butane | 16.5 |
| n-Heptane | 7 |
| n-Decane | 3 |
| n-Dodecane | 2 |
| n-Pentadecane | 1.5 |

TABLE 3

| | $k_{rg}$ | $k_{ro}$ | Improvement Factor |
|---|---|---|---|
| Pre-Treatment 2-phase flow | 0.066 | 0.075 | |
| Post-Treatment 2-phase flow | 0.112 | 0.127 | 1.7 |

The core was then flushed with 20 pore volumes of fluid (described in Table 5 (below)). The pre-flush displaces the high salinity brine from the core and thus prevents the treatment solution (composition given in Table 4 (below)) from reaching the cloud point which could happen in the presence of high salinity brine or high water saturation. The core was then treated with 20 pore volumes of Composition A, described in Table 4 (below), and then shut-in for 15 hours. The steady state two-phase flow of gas and condensate was then done under the same conditions as the pre-treatment two-phase flow. Table 3 (above) summarizes the results for the post-treatment two-phase flow. The results show that the chemical treatment increased the gas and condensate relative permeability by a factor of about 1.7. Table 6 (below) shows the compatibility test results between Composition A and the brine used in Example 1 at 160° C.

TABLE 4

| Composition Component | wt % |
|---|---|
| Nonionic Fluorinated Polymeric Surfactant A | 2 |
| Propylene Glycol (PG) | 69 |
| Isopropyl alcohol (IPA) | 29 |

TABLE 5

| Fluid Component | wt % |
|---|---|
| Propylene Glycol (PG) | 70 |
| Isopropyl alcohol (IPA) | 30 |

TABLE 6

| Brine, gms | Composition-A (Table-4), gms | Brine wt % | Solubility |
|---|---|---|---|
| 1 | 4 | 20 | Clear |
| 1.25 | 3.75 | 25 | Clear |
| 1.5 | 3.5 | 30 | Hazy |
| 1.75 | 3.25 | 35 | Cloudy |

The results show that pre-flush with fluid provides an effective means of treating sandstone formations producing gas condensate fluids with high salinity brine present. The pre-flush will also be useful in treating formations that have high water saturation, as the pre-flush may solubilize or displace most of the water before the formation is treated with a nonionic fluorinated polymeric surfactant. The fluid pre-flush may reduce or eliminate the possibility of the treatment solution reaching the cloud point while treating the above-mentioned formations, and thus makes the treatment more effective.

EXAMPLE 2

This procedure used a fluid pre-flush before treating a low permeability gas condensate sandstone formation that has high salinity brine present. The procedure was performed on a sandstone reservoir plug core having the characteristics as described in Table 7 (below) at the reservoir temperature of 279° F. (137.2° C.). Table 7 (below) summarizes properties of the core and the procedure conditions.

TABLE 7

| Core | Sandstone |
|---|---|
| Length, inches (cm) | 1.9 |
| Diameter, inches (cm) | 1 (2.54) |
| Porosity, % | 13 |
| Pore volume, cc | 3.17 |
| Swi, % | 15 |
| Temperature, ° F. (° C.) | 279 (137.2) |
| k, md | 7.3 |
| $k_g(S_{wi})$ | 6.9 |

Core preparation. The core was dried in an oven at 100° C. for 24 hours and then was weighed. The core was then wrapped with polytetrafluoroethylene (PTFE), aluminum foil and shrink wrapped with "TEFLON HEAT SHRINK TUBING". The wrapped core was placed into a core holder inside the oven at 279° F. (137.2° C.).

Core preparation. The initial gas permeability was measured using nitrogen at 75° F. (23.8° C.). The initial brine saturation of 15% was established by injecting a measured volume of brine into the vacuumed core. The salinity of brine used was 230,000 ppm with the brine composition of Table 8 (below). The gas relative permeability at initial water saturation was measured using nitrogen at 75° F. (23.8° C.).

TABLE 8

| Chemical | g/L |
|---|---|
| NaCl | 225.2 |
| $CaCl_2$ | 1.5 |
| KCl | 3.1 |

A synthetic hydrocarbon mixture was prepared that exhibits retrograde gas condensate behavior. Table 9 (below) gives the composition of the synthetic gas mixture. A two-phase flood with the fluid mixture was done using the dynamic flashing method, which is also known as the pseudo-steady state method, by flashing the fluid through the upstream back-pressure regulator set above the dew point pressure at 5500 psig (37.91 MPa) to the core pressure set below the dew point pressure by the downstream back-pressure regulator. This experiment was done at a core pressure of 2600 psig (17.92 MPa). Table 10 (below) summarizes the results for the pre-treatment two-phase flow.

TABLE 9

| Component | Mole % |
| --- | --- |
| Methane | 95 |
| Propane | 1 |
| n-Heptane | 1.25 |
| n-Decane | 1.25 |
| n-Pentadecane | 1.5 |

TABLE 10

| | $k_{rg}$ | $k_{ro}$ | Improvement Factor |
| --- | --- | --- | --- |
| Pre-Treatment 2-phase flow | 0.067 | 0.032 | n/a |
| Post-Treatment 2-phase flow | 0.091 | 0.043 | 1.36 |

The core was then flushed with 9 pore volumes of fluid (described in Table 11, below). The pre-flush displaces the high salinity brine from the core and thus prevents Composition B (described in Table 11, below) from reaching the cloud point which can happen in the presence of high salinity brine present in the core. The core was then treated with 20 pore volumes of the composition given in Table 11 (below) and then shut-in for 15 hours. The steady state two-phase flow of gas and condensate was then done under the same conditions as the pre-treatment two-phase flow. Table 10 (above) summarizes the results for the post-treatment two-phase flow. The results show that the chemical treatment increased the gas and condensate relative permeability by a factor of about 1.36.

TABLE 11

| Component | wt % |
| --- | --- |
| Nonionic Fluorinated Polymeric Surfactant A | 2 |
| Propylene Glycol (PG) | 69 |
| Isopropyl alcohol (IPA) | 29 |

TABLE 12

| Fluid Component | wt % |
| --- | --- |
| Propylene Glycol (PG) | 70 |
| Isopropyl alcohol (IPA) | 30 |

EXAMPLE 3

In this example a fluid pre-flush was used before treating a gas condensate sandstone formation that has initial water present. The example was performed using a Berea sandstone core at a temperature of 275° F. (135° C.).

A core with the dimensions specified below was cut from a source rock block. The core was dried in an oven at 100° C. for 24 hours and then was weighed. The core was then wrapped with polytetrafluoroethylene (PTFE), aluminum foil and shrink wrapped with "TEFLON HEAT SHRINK TUBING". The wrapped core was placed into a core holder inside the oven at 275° F. (135° C.).

The initial gas permeability was measured using nitrogen at 75° F. (23.9° C.). The initial brine saturation of 26% was established by injecting a measured volume of brine into the vacuumed core. The gas relative permeability at initial water saturation was measured using nitrogen at 75° F. (23.9° C.). Table 13 (below) summarizes the properties of the core and procedure conditions.

TABLE 13

| Core | Berea Sandstone |
| --- | --- |
| Length, inches | 8 |
| Diameter, inches (cm) | 1 (2.54) |
| Porosity, % | 20 |
| Pore volume, cc | 20.59 |
| Swi, % | 26 |
| Temperature, ° F. (° C.) | 275 (137.2) |
| k, md | 231 |

The composition of brine is given in Table 14.

TABLE 14

| Salt | PPM |
| --- | --- |
| NaCl | 59000 |
| $CaCl_2$ | 16000 |
| $MgCl_2 \cdot 6H_2O$ | 3500 |

A synthetic hydrocarbon mixture was prepared that exhibits retrograde gas condensate behavior. Table 15 (below) gives the composition of the synthetic gas mixture. A two-phase flood (condensate flood-1) with the fluid mixture was done using the dynamic flashing method, which is also known as the pseudo-steady state method, by flashing the fluid through the upstream back-pressure regulator set above the dew point pressure at 4500 psig to the core pressure set below the dew point pressure by the downstream back-pressure regulator. This example was done at a core pressure of 1500 psig. Table 15 (below) summarizes the results for the pre-treatment two-phase flow.

TABLE 15

| Component | Mole % |
| --- | --- |
| Methane | 91.605 |
| n-Butane | 3.94 |
| n-Decane | 1.97 |
| n-Pentadecane | 0.985 |
| Water | 1.5 |

The core was then flushed with 16 pore volumes of methanol to displace brine. The methanol was flushed out by flowing two-phase gas condensate mixture through the core. The core was then treated with 19 pore volumes of the composition given in Table 17 (below) and then shut-in for 24 hours. The steady state two-phase flow of gas and condensate (condensate flood-2) was then done under the same conditions as the pre-treatment two-phase flow. Table 16 (below) summarizes the results for the condensate flood-2. The results show that the chemical treatment had negligible effect on the gas and condensate relative permeability.

TABLE 16

| | $k_{rg}$ | $k_{ro}$ | Improvement Factor |
| --- | --- | --- | --- |
| Condensate flood-1 (Pre-Treatment 2-phase flow) | 0.074 | 0.025 | |
| Condensate flood-2 | 0.082 | 0.028 | 1.1 |
| Condensate flood-3 | 0.121 | 0.042 | 1.64 |

TABLE 17

| Component | wt % |
| --- | --- |
| Nonionic Fluorinated Polymeric Surfactant A | 2 |
| Methanol | 94 |
| Water | 4 |

Next the core was flushed with 16 pore volumes of toluene. The toluene was then flushed out by flowing two-phase gas condensate mixture through the core. The core was then re-treated with 20 pore volumes of the composition given in Table 17 (above) and then shut-in for 24 hours.

Finally, the steady state two-phase flow of gas and condensate (condensate flood-3) was then done under the same conditions as the pre-treatment two-phase flow. Table 16 (above) summarizes the results for the condensate flood-3. The results show that the chemical treatment improved the gas and condensate relative permeability by a factor of 1.64.

COMPARATIVE EXAMPLE A

Composition. Nonionic Fluorinated Polymeric Surfactant A (2% by weight), methanol (94% by weight), and water (4% by weight) were mixed together using a magnetic stirrer and magnetic stir bar.

Core Flood Evaluation

Substrates. A Berea sandstone core plug was used in the core flood evaluation. The core had the properties shown in Table 18, below.

TABLE 18

| | |
| --- | --- |
| Diameter, inch (cm) | 1.0 (2.54) |
| Length, inch (cm) | 8.0 (20.32) |
| Pore volume, mL | 20.6 |
| Porosity, % | 20.0 |

The porosity was measured using either a gas expansion method or by the weight difference between a dry and a fully saturated core sample. The pore volume is the product of the bulk volume and the porosity.

Synthetic Condensate Composition. A synthetic gas-condensate fluid containing 93 mole percent methane, 4 mole percent n-butane, 2 mole percent n-decane, and 1 mole percent n-pentadecane was used for the core flood evaluation. Approximate values for various properties of the fluid are reported Table 19, below.

TABLE 19

| | |
| --- | --- |
| Dewpoint, psig (Pa) | 4200 ($2.9 \times 10^7$) |
| Core pressure, psig (Pa) | 1500 ($1.0 \times 10^7$) |
| Liquid dropout, V/Vt % | 3.2 |
| Gas viscosity, cP | 0.017 |
| Oil viscosity, cP | 0.22 |
| Interfacial tension, dynes/cm | 5.0 |

Core Preparation. The core was dried for 72 hours in a standard laboratory oven at 95° C. and then wrapped in aluminum foil and "TEFLON HEAT SHRINK TUBING". Referring to FIG. 3, the wrapped core 109 was placed in core holder 108 inside oven 110 at 75° F. (24° C.). An overburden pressure of 3400 psig ($2.3 \times 10^7$ Pa) was applied. The initial single-phase gas permeability was measured using either nitrogen or methane at a flowing pressure of 1200 psig ($8.3 \times 10^6$ Pa).

Brine, containing 92.25% water, 5.9% sodium chloride, 1.6% calcium chloride, 0.23% magnesium chloride hexahydrate, and 0.05% potassium chloride, was introduced into the core 109 by the following procedure. The outlet end of the core holder was connected to a vacuum pump and a full vacuum was applied for 30 minutes with the inlet closed. The inlet was connected to a burette with the brine in it. The outlet was closed and the inlet was opened to allow a known volume of brine to flow into the core. For example, a 26% water saturation (i.e., 26% of the pore volume of the core was saturated with water) was established by allowing 5.3 ml of brine to flow into the core before the inlet value was closed. The permeability was measured at 26% water saturation by flowing nitrogen or methane gas at 1200 psig ($8.3 \times 10^6$ Pa) and 75° F. (24° C.).

Core Flooding Procedure. Referring again to FIG. 3, the wrapped core 109 in the core holder 108 was placed inside oven 110 at 275° F. (135° C.) for several hours to allow it to reach reservoir temperature. The synthetic gas-condensate fluid described above was then introduced at a flow rate of about 690 mL/hr until steady state was established. Upstream back-pressure regulator 106 was set at about 4900 psig ($3.38 \times 10^7$ Pa), above the dew point pressure of the fluid, and downstream back-pressure regulator 104 was set at about 1500 psig ($3.38 \times 10^7$ Pa), corresponding to the bottom hole flowing well pressure. The gas relative permeability before treatment was then calculated from the steady state pressure drop. The surfactant composition was then injected into the core without first injecting a fluid into the core to attempt to solubilize or displace brine. After at least 20 pore volumes of the surfactant composition were injected, the surfactant composition was held in the core at 275° F. (135° C.) for about 15 hours. The synthetic gas condensate fluid described above was then introduced again at a flow rate of about 690 mL/hr using positive displacement pump 102 until a steady state was reached. The gas relative permeability after treatment was then calculated from the steady state pressure drop. Following the relative permeability measurements, methane gas was injected, using positive displacement pump 102, to displace the condensate and measure the final single-phase gas permeability to demonstrate that no damage had been done to the core.

The initial single-phase gas permeability, measured prior to brine saturation, the initial capillary number, the gas relative permeability before treatment with the surfactant composition, the gas relative permeability after treatment, and the ratio of the gas relative permeabilities after and before treatment (i.e., improvement factor) for Comparative Example A are reported in Table 20, below.

TABLE 20

| | |
| --- | --- |
| Gas permeability, millidarcy (md) | 231 |
| Capillary number | $1.1 \times 10^{-5}$ |
| Gas relative permeability before treatment | 0.084 |
| Gas relative permeability after treatment | 0.084 |
| Improvement factor | 1.0 |

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

What is claimed is:

1. A method of treating a hydrocarbon-bearing clastic formation having brine, the method comprising:
   contacting the hydrocarbon-bearing clastic formation with a fluid, wherein the fluid at least one of at least partially solubilizes or at least partially displaces the brine in the hydrocarbon-bearing clastic formation; and
   subsequently contacting the hydrocarbon-bearing clastic formation with a composition, the composition comprising:
   a nonionic fluorinated polymeric surfactant comprising:
   at least one divalent unit represented by formula:

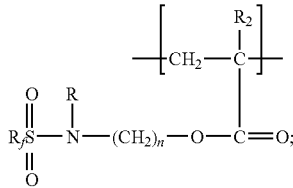

and
   a poly(alkyleneoxy) segment;
   wherein
   $R_f$ represents a perfluoroalkyl group having from 1 to 8 carbon atoms;
   R and $R_2$ are each independently hydrogen or alkyl of 1 to 4 carbon atoms; and
   n is an integer from 2 to 10; and
   solvent, wherein when the composition is contacting the hydrocarbon-bearing clastic formation, the nonionic fluorinated polymeric surfactant has a cloud point that is above the temperature of the hydrocarbon-bearing clastic formation.

2. The method of claim 1, wherein when the composition is contacting the hydrocarbon-bearing clastic formation, the formation is substantially free of precipitated salt.

3. The method of claim 1, wherein the fluid is essentially free of surfactant.

4. The method of claim 1, wherein the fluid comprises at least one of toluene, diesel, heptane, octane, or condensate.

5. The method of claim 1, wherein the fluid at least partially solubilizes the brine.

6. The method of claim 1, wherein the fluid comprises at least one of a polyol or polyol ether, wherein the polyol and polyol ether independently have from 2 to 25 carbon atoms.

7. The method of claim 6, wherein the polyol or polyol ether is at least one of 2-butoxyethanol, ethylene glycol, propylene glycol, polypropylene glycol), 1,3-propanediol, 1,8-octanediol, diethylene glycol monomethyl ether, ethylene glycol monobutyl ether, or dipropylene glycol monomethyl ether.

8. The method of claim 1, wherein the fluid comprises water or at least one monohydroxy alcohol, ether, or ketone independently having from 1 to 4 carbon atoms.

9. The method of claim 1, wherein the fluid comprises at least one of nitrogen, carbon dioxide, or methane.

10. The method of claim 1, wherein the solvent comprises water.

11. The method of claim 1, wherein the solvent comprises at least one of a polyol or polyol ether, wherein the polyol and polyol ether independently have from 2 to 25 carbon atoms; and wherein the solvent comprises at least one of monohydroxy alcohol, ether, or ketone independently having from 1 to 4 carbon atoms.

12. The method of claim 11, wherein the polyol or polyol ether is at least one of 2-butoxyethanol, ethylene glycol, propylene glycol, poly(propylene glycol), 1,3-propanediol, 1,8-octanediol, diethylene glycol monomethyl ether, ethylene glycol monobutyl ether, or dipropylene glycol monomethyl ether.

13. The method of claim 1, wherein $R_f$ is perfluorobutyl.

14. The method of claim 1, wherein the hydrocarbon-bearing clastic formation has at least one first gas permeability prior to contacting the formation with the fluid and contacting the formation with the composition and at least one second gas permeability after contacting the formation with the fluid and contacting the formation with the composition, and wherein the second gas permeability is at least 5 percent higher than the first gas permeability.

15. The method of claim 14, wherein the first and second gas permeabilities are gas relative permeabilities.

16. The method of claim 1, further comprising allowing condensate to flow into the hydrocarbon-bearing clastic formation after contacting the formation with the fluid and prior to contacting the formation with the composition.

17. The method of claim 1, wherein the formation has condensate, and wherein the fluid at least one of at least partially solubilizes or at least partially displaces the condensate.

18. The method of claim 1, wherein the hydrocarbon-bearing clastic formation is penetrated by a well bore, and wherein the method further comprises obtaining hydrocarbons from the well bore after contacting the hydrocarbon-bearing clastic formation with the composition.

19. The method of claim 1, wherein the hydrocarbon-bearing clastic formation has at least one fracture, and wherein the fracture has a plurality of proppants therein.

20. The method of claim 1, wherein the poly(alkyleneoxy) segment comprises at least one divalent unit represented by formula:

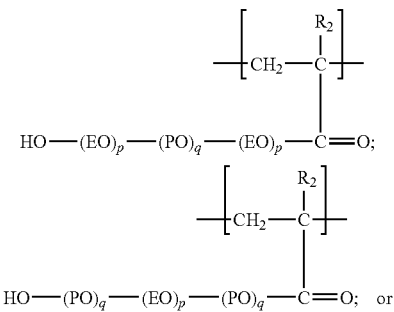

-continued
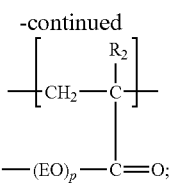
wherein
R$_1$ and R$_2$ are each independently hydrogen or alkyl of 1 to 4 carbon atoms;
EO represents —CH$_2$CH$_2$O—;
each PO independently represents —CH(CH$_3$)CH$_2$O— or —CH$_2$CH(CH$_3$)O—;
each p is independently from 1 to about 128; and
each q is independently from 0 to about 55.
* * * * *